G. BAILEY.
Harvester.
No. 44,064.
Patented Sept. 6, 1864.
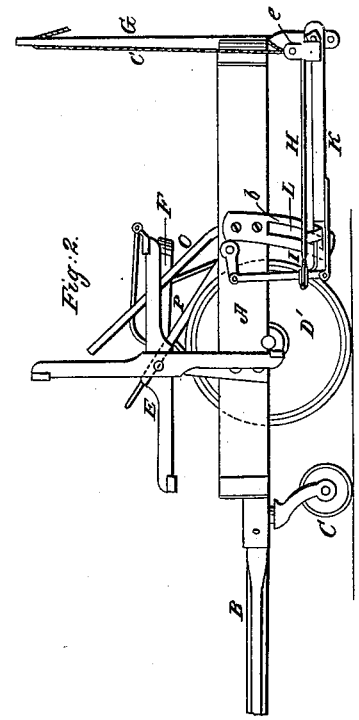
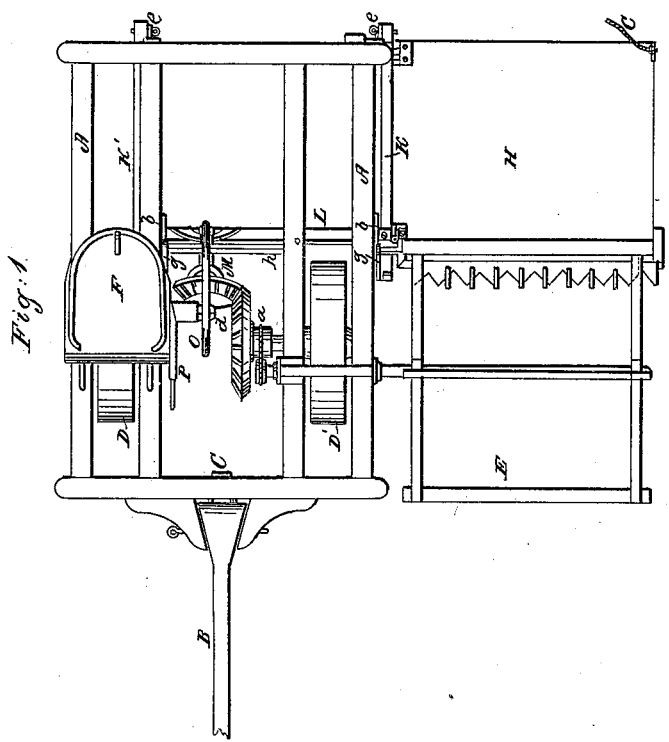
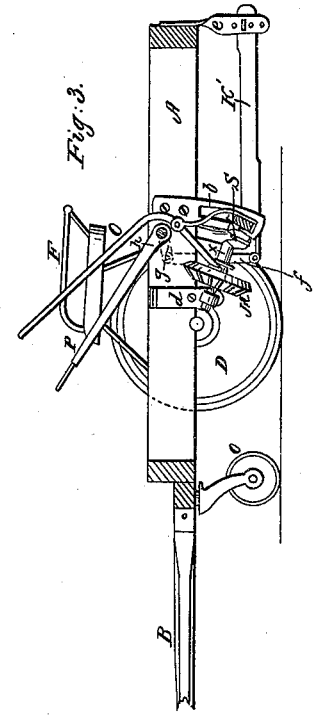

UNITED STATES PATENT OFFICE.

GEORGE BAILEY, OF WISCOTTA, IOWA.

IMPROVEMENT IN HARVESTERS.

Specification forming part of Letters Patent No. 44,064, dated September 6, 1864; antedated December 11, 1861.

*To all whom it may concern:*

Be it known that I, GEORGE BAILEY, of Wiscotta, in the county of Dallas and State of Iowa, have invented certain new and useful Improvements in Harvesters or Reaping-Machines; and I do hereby declare that the following, taken in connection with the accompanying drawings, which form part of this specification, is such a full and clear description as to enable others skilled in the construction and working of harvesters and reapers generally to make and use the same.

In said drawings, Figure 1 represents a plan view of a harvester constructed according to my improvement; Fig. 2, a side elevation of the same, and Fig. 3 a side sectional view thereof.

It is not necessary here to refer either in general or in detail to the several combinations or arrangements of means which have before been proposed or resorted to for operating and raising and lowering or adjusting the cutter and grain table or platform in harvesting or reaping machines. That there have been various devices or combinations of means for such purposes, including the raising and lowering of the cutter by the driver on or from his seat, is a well-known fact, and as many or most of these plans are familiar to those whom my improvement concerns a brief and literal description of my invention will suffice to explain it.

The object of my invention consists in dispensing with what is termed the "grain-wheel"— *i. e.*, the wheel that supports the outer or grain side of the platform in order to keep it at the desired level in all its parts. I effect this by the means and in the manner as follows:

Referring to the accompanying drawings, A represents the draft-frame of the machine; B, the draft-bar or perch, which may have arranged under its rear end a caster-wheel, C.

D D' are the running-wheels of the machine, the inner one, D, of which may serve as the driver to the reel and sickle or cutter.

E is the reel, that may be driven by a cord or band, *a*.

F is the driver's seat, and G the raker's prop or seat-stand.

H is the cut-grain-receiving platform or apron, and I the reciprocating sickle os cutter.

The apron H is hinged on its side next to the draft-frame, at the back, to an inner side bar, K, and at its front to a crop-bar, L, that lies or rests on the inner side bar, K, and on an outer side bar, K', so that by pulling down on a rope or chain, *c*, attached at its one end to the outer side of the platform and passing through an eye in the raker's prop the platform may be raised and with it the sickle or cutter up out of the way when these devices are not required to perform their functions proper, as in taking the machine to and from the field. The cross-bar L projects through with freedom to slide up and down in curved guides *b b*, and it serves to support the one end of the cranked shaft *x*, which gives motion by a connecting-rod, *s*, to the reciprocating cutter. The other end of said shaft *x* works in a box or bracket, *d*, that is pivoted horizontally to the main or draft frame, so that in raising or lowering or adjusting the cutter to cut high or low, as hereinafter described, and which is accomplished by raising or lowering the cross-bar L, the bevel-wheel or pinion M on said shaft that actuates the latter and receives its motion from a bevel-wheel, N, on the shaft of the inner running-wheel will or may in all such adjustments be made to occupy a proper and relative working position in gear with its driver by the pivoted bracket *d* acting as a center of motion to the swinging adjustment of the cutter-operating pinion and its shaft. Said pinion M may slide on its shaft and be operated by a clutch-lever, *o*, from the driver's seat to throw the cutter in or out of gear, as desired.

The side bars, K K', are hinged preferably in an adjustable manner to the draft-frame in its rear, or to brackets *e e*, attached thereto, and are so locked below the level of the apron or platform as that the cut grain may be raked from the platform to one side and directly under the main or draft frame to lie in the track thereof, which gives a sheltered discharge till the grain is deposited on the ground, and is in other respects advantageous. The front ends of these side bars, K K', which lift the cross-bar L, and with it the cutter, &c., are connected by rods *f* to cranks *g*, fitted onto the ends of a cross rock-shaft, *h*, that may be operated by a lever, P, from the driver's seat, to raise and lower or adjust the height of the cutter, &c., and which may be denominated the sickle-frame.

What I claim as my improvement in harvesters is—

1. The combination of the hinged platform, the pivoted side levers, and vertically-adjustable cross-bar, so arranged as to allow the gavel to be raked off under the main frame, substantially as and for the purposes set forth.

2. In combination with the up-and-down adjustable cross-bar to the sickle-frame, a swiveling or pivoted bracket for supporting, in connection with the cross-bar, the cutter-driving gear, and to admit of perfect adjustment of the latter to its driver in effecting the up and down adjustment of the sickle-frame, substantially as herein specified.

3. In combination with the cross-bar L and the pinion or bevel-wheel M, arranged in relation to each other to operate substantially as described, the curved guide or guides $b$, for the purposes set forth.

In testimony whereof I have signed my name to this specification before two subscribing witnesses.

GEORGE BAILEY.

Witnesses:
 A. POLLAK,
 EDM. F. BROWN.